(12) United States Patent
Cranford, Jr. et al.

(10) Patent No.: US 7,983,368 B2
(45) Date of Patent: Jul. 19, 2011

(54) SYSTEMS AND ARRANGEMENTS FOR CLOCK AND DATA RECOVERY IN COMMUNICATIONS

(75) Inventors: Hayden C. Cranford, Jr., Cary, NC (US); Daniel J. Friedman, Sleepy Hollow, NY (US); Mounir Meghelli, Tarrytown, NY (US); Thomas H. Toifl, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1098 days.

(21) Appl. No.: 11/608,948

(22) Filed: Dec. 11, 2006

(65) Prior Publication Data

US 2008/0137789 A1 Jun. 12, 2008

(51) Int. Cl.
*H04L 7/00* (2006.01)

(52) U.S. Cl. ........ 375/354; 375/219; 375/226; 375/327; 375/342; 375/355; 327/158; 327/161; 370/517

(58) Field of Classification Search ........... 375/293, 375/294, 327, 354, 355, 359, 360, 364, 368, 375/371, 376, 299, 316, 342, 219, 350
See application file for complete search history.

(56) References Cited

U.S. PATENT DOCUMENTS

| 6,711,226 | B1 | 3/2004 | Williams et al. | |
|---|---|---|---|---|
| 6,950,484 | B1 | 9/2005 | Jordan et al. | |
| 7,209,531 | B1 * | 4/2007 | Katz et al. | 375/371 |
| 7,499,511 | B2 * | 3/2009 | Okamura | 375/355 |
| 7,515,668 | B1 * | 4/2009 | Rokhsaz | 375/355 |
| 7,738,602 | B2 * | 6/2010 | Langenbach et al. | 375/341 |
| 7,801,257 | B2 * | 9/2010 | Eglit | 375/355 |
| 7,817,712 | B2 * | 10/2010 | Hidaka | 375/230 |
| 2003/0007549 | A1 * | 1/2003 | Kada et al. | 375/219 |
| 2003/0107418 | A1 | 6/2003 | Chang et al. | |
| 2004/0260493 | A1 | 12/2004 | Richmond | |
| 2006/0034394 | A1 * | 2/2006 | Popescu et al. | 375/326 |
| 2007/0300119 | A1 * | 12/2007 | Hidaka | 714/746 |
| 2008/0002762 | A1 * | 1/2008 | Cranford et al. | 375/226 |

* cited by examiner

*Primary Examiner* — Shuwang Liu
*Assistant Examiner* — Hirdepal Singh
(74) *Attorney, Agent, or Firm* — Ian D. MacKinnon; Schubert Law Group PLLC (57) ABSTRACT

A sampling clock signal controller for receivers of digital data is disclosed. Specific bit patterns of a data waveform can be identified, and stored time samples of the waveform that correspond to the specific bit patterns can be analyzed to improve the timing of a sampling clock signal. These "time-amplitude" samples on known bit patterns can be utilized to determine if a sample on the data waveform should be taken before the center of the eye pattern, at the center of the eye pattern, or after the center of the eye pattern and by what time change. Accordingly, a single low power clock can be utilized to adjust the timing of the sample clock such that improved communication scan be achieved. Such a single clock system has reduced power requirements and increased accuracy.

16 Claims, 5 Drawing Sheets

SYSTEMS AND ARRANGEMENTS FOR CLOCK AND DATA RECOVERY IN COMMUNICATIONS

FIELD OF INVENTION

The present disclosure is in the field of communications systems and more particularly in the field of clock and data recovery systems.

BACKGROUND

Communication systems typically utilize some form of clock system to synchronize communications between a transmitter and a receiver. In digital communication systems the receiver must operate at the same average frequency as the transmitting end to prevent loss of information. When digital signals are transported over a network of digital communication links, switching nodes, multiplexers, transmission line interfaces, and the task of keeping all the entities operating at the same average frequency is referred to as network synchronization.

Generally, in Gigahertz communication systems it is important that a receiver reads or samples the data waveform when the amplitude of the data waveform reaches a steady state. Many techniques can be utilized to determine when to sample the data waveform and this process is commonly referred to as clock and data recovery (CDR). In a CDR system, when the timing of the receiver is synchronized with the data waveform, a sampling clock of the receiver will trigger a receiving component such as a latch to acquire the logic value provided by the waveform at an appropriate time. Traditional CDR systems utilize two system clocks or two sampling clock signals that cycle every bit interval or bit cycle and thus consume considerable power. A first monitoring clock is typically utilized to detect the timing of the incoming waveform and the first clock can control or synchronize a second clock that actually controls when the data waveform is sampled for data acquisition.

CDR systems generally operate plesiochronously where a transmitter clock has a frequency that operates at a "known" frequency and the receiver clock operates at the same frequency, with some small frequency offset. Plesiochronous operation occurs generally where critical timing moments occur nominally at the same rate and any variation in rate is constrained within specified limits. Although the frequency of the sampling clock can be set based on the frequency of the transmitter clock, unknown delays can occur between the transmitter and the receiver. In addition, the timing of the received waveform can undergo random changes, known as timing jitter, which are induced by non-idealities of the clock circuitries. Hence, the exact sample time needs to be determined by the receiver in order to accurately recover data from the transmitted data waveform.

Ideally, clock and data recovery circuitry can perform voltage detection and "phase slicing" levels in relation to a center of a pulse or a position between subsequent transitions of a differential signal. A differential signal has two signals that are one hundred eighty degrees out of phase and each signal can be carried on a separate conductor. These signals are often labeled as a data signal and a complementary data signal. Since the signals are 180 degrees out of phase, when data is being transmitted, the signal on the data line will have an opposite value of the signal on the complementary data line. It can be appreciated that signals cannot transition instantaneously and particularly in high speed Gigahertz communications signals the time interval that the signal stays at is steady state may be shorter than the time required for the signal to transition, and thus, when certain bit patterns are present, the data waveform can look like a sin wave. Accordingly, a picture of a differential signal often looks like two opposing sinusoidal waves that crossover at an average voltage on the graph at various intervals depending on the content of the data being transmitted.

Thus, between crossovers of differential data signals or waveforms an eye shape is typically formed, often called an eye pattern. Since the differential signal can "float" with reference to ground and the voltages and differential voltage can continually change, often, the size of the eye will continually change or be stressed, however some form of an eye pattern will typically remain. In many applications, the preferred time to read the data is in the middle of the eye or half way between where the differential signals cross over each other during consecutive transitions. However, it is often difficult to determine an optimum time to sample the data waveform because for example, the optimum time may not be at the center of the eye pattern due to waveform anomalies.

Recent advances in CDR systems have implemented additional circuits that can determine the center of the eye of the waveform, and/or a preferred time to sample the data stream. As stated above, virtually all of these designs have multiple system clocks and other control circuitry and such systems draw a significant amount of power and take up a lot of valuable space on an integrated circuit. Although some of these configurations do improve the bit error rates, the penalty paid in power and size far outweighs the benefits provided by such circuits.

As stated above, many CDR systems synchronize to the incoming data waveform by detecting a crossover of the two differential data lines and then sample the data waveform responsive to a sampling clock signal that triggers a read of the data waveform half way into the bit cycle. Thus, data is acquired from the transmission line during a distinct time interval when the sampling clock is active. Clock generation and distribution circuits are one of, if not the biggest power consumers in an integrated circuit. More particularly, clock circuits utilized in data receiving circuits are very "power hungry" because multiple clocks are required. These multiple clocks must be accurate and are therefore generated by complex "power hungry" phase generator circuits. These circuits include delay-locked-loop (DLL), phase-locked loop (PLL), and phase rotator type clock generator circuits.

Currently, communication or information systems are transmitting and receiving data in the Gigabit per second range. Increasing the accuracy of CDR amidst noise and distortions often present on a transmission line is a formidable task because the time intervals of signal transitions and steady state values can become very small and this requires extreme precision of the clock signals. As stated above, clock generation and distribution in CDR circuits is one of the biggest contributors to power consumption. Thus, an architecture with minimal clock signals and minimal clock signal transitions will provide a significant improvement in CDR systems.

SUMMARY OF THE INVENTION

The problems identified above are in large part addressed by the systems, arrangements, methods and media disclosed herein to provide, in one embodiment, a sampling clock signal for receivers of digital data. The sampling clock signal is suitable for clock and data recovery (CDR) applications. In one embodiment, predetermined bit patterns can be stored and a plurality of time-amplitude samples of a waveform can be acquired and stored. When the system detects the occurrence of the predetermined bit patterns, the time-amplitude samples that correspond to the detected bit patterns can be retrieved from memory and analyzed to determine if the timing of the data sampling clock can be improved. The time-amplitude samples can be taken proximate to rising and/or falling edges of transitioning waveforms that encode predetermined bit patterns such that an accurate determination of whether the waveform is leading or lagging a data sampling clock by a preferred amount can be determined.

In response to this analysis, the data sampling clock of the receiver can be adjusted to improve the data recovery performance of the receiver. When the waveform transition is leading the center of the eye in excess of a predetermined amount, the sample clock can be advanced by the predetermined amount and when the waveform transition is lagging the center of the eye by a predetermined amount, the sample clock can be retarded by the predetermined amount such that improved communications can be achieved.

Useable time-amplitude samples can be strategically acquired by a sampling system that utilizes two sampling feedback loops that are continually adjusted according to a converging routine. The time-amplitude sampling method and arrangement can utilize a timing feedback loop and a voltage level feed back loop both controlled by a logic module. The timing loop can control/alter the time of acquisition of the sample and the voltage loop can vary the voltage detection aspect such that the system can determine if, at a specific time the waveform provides a specific voltage or, the converse, when at a specific time the waveform is not at a specific voltage. The time-amplitude testing pattern or routing can be facilitated by a waveform monitoring clock that feeds an adjustable delay module where the adjustable delay module is controlled by the timing feedback loop. The logic module can provide the timing feedback loop signal and, the voltage feedback loop signal or offset voltage in the sampling procedure.

The time-amplitude sample can be stored as a single bit representing a hit or a miss. The single bit can capture a logic high when the waveform voltage is higher than the offset voltage and can acquire a logic low when the offset voltage is higher than the waveform voltage at the specific time defined by the timing loop signal. As the amplitude loop voltage is increased or decreased, the time-amplitude location of the waveform transition can be accurately located by the logic module and utilizing such an accurate location utilizing a converging routine, the logic module can detect timing deficiencies of the data sampling clock and adjust the timing of a receiver sampling clock.

In one embodiment, "large transition" type bit patterns (a bit pattern that has two sequential bits of the same value) such as a sequential bit pattern of 1-1-0 (falling) and 0-0-1 (rising) can be predetermined bit patterns that trigger the sampling loops and the review of the time-amplitude data by the logic module. A bit pattern filter can identify these large transitions and can activate the logic module to retrieve and analyze the stored time-amplitude samples that correspond to the detected large transition(s). Such an analysis by the logic module may alter the testing process via feedback loops or it may adjust the timing of the data sampling clock of the receiver depending on the contents of the data.

In one embodiment, acquisition of time-amplitude samples can utilize a distributed clock, divided locally into three sequential clock signals by two inverters. The three sequential clock signals can be utilized to acquire time-amplitude samples of the data waveform at three different time intervals during the bit cycle. The middle clock signal can be utilized as both a waveform sampling clock and as the data sampling clock, where the first and last of the three sequential signals can be utilized solely for data clock recovery functions.

In a specific embodiment, time-amplitude samples can be taken over the course of hundreds of bits, tagged with bit patterns and stored such that the time-amplitude samples can be related to the bit pattern occurring during their acquisition. When specific bit patterns, such as five large three bit transitions occurring at various times are all identified, the time-amplitude samples related to all five occurrences of the large transitions can all be retrieved for analysis. Such a robust data set on waveforms that are relatively steady over time allows the logic module to compare time-amplitude samples that are taken at many different time locations for the same bit pattern to determine where the rising edge or falling edge is occurring (on the average). Also such a data set can provide medians and averages that can be utilized to improve the data sampling and waveform sampling process.

In another embodiment, a communication system is provided that has a transmitter to transmit a data waveform, a transmission line to convey the data waveform and a receiver to receive the data waveform. The system also includes a logic module to implement a test sampling routine and a bit pattern filter to filter the data waveform to determine or identify incoming bit patterns. When a received bit pattern matches a predetermined bit pattern the acquired parameters of the waveform can be utilized to synchronize a sampling clock signal for a receiver such that the receiver can perform data recovery functions.

Accordingly, the above disclosed single, low power clock system can be utilized by a CDR system to recover data over a communication link and to adjust the timing of the sample clock such that the bit error rate of a communication system can be improved. Traditional clock data recovery systems utilize two distributed clocks, and the disclosed single clock system will generally consume only half of the power required by traditional CDR systems. Such a single clock system will also provide increased accuracy in sampling times and data acquisition and create less interference for other circuits.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims. The descriptions below are designed to make such embodiments obvious to a person of ordinary skill in the art.

While specific embodiments will be described below with reference to particular configurations of hardware and/or software, those of skill in the art will realize that embodiments of the present invention may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Figure 1:
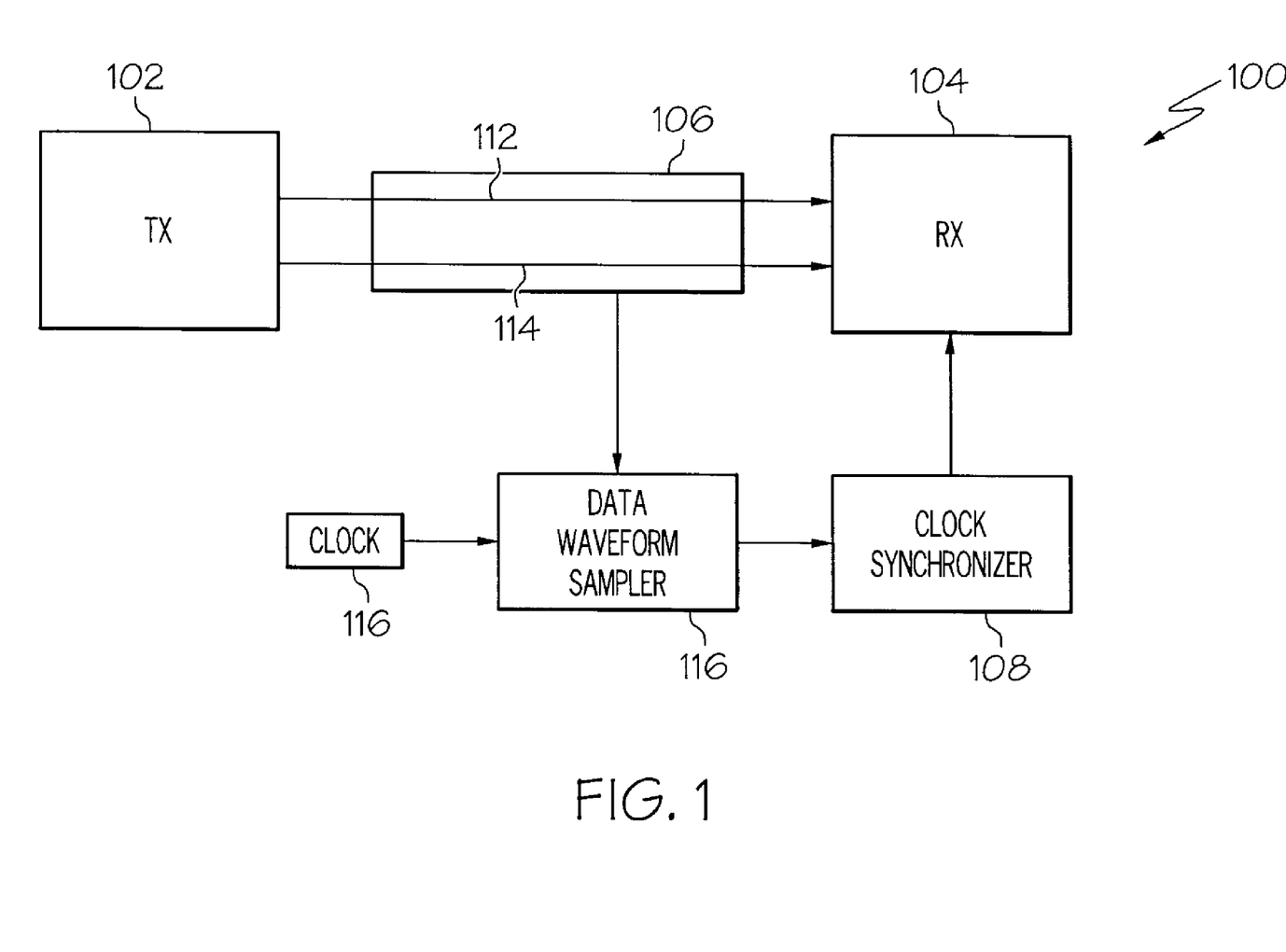
FIG. 1 illustrates a block diagram of a communication system with a clock and data recovery circuit.

Referring to FIG. 1, a communication system 100 is illustrated. The communication system 100 can include a transmitter 102, a receiver 104 and an impedance controlled transmission line 106 interconnecting the transmitter 102 to the receiver 104. The transmission line 106 can carry differential data that has a data line 112 and a complementary data line 114 such that when one line provides a logic high value the other line provides a logic low value and vise-versa. The receiver 104 can perform clock and data recovery (CDR) with the assistance of clock 110, data waveform sampler 116 and clock synchronizer 108. The dashed box illustrates CDR components 110 116 and 108 that could be integrated as part of the receiver 104 and on the same integrated circuit, although the CDR components are shown independently herein for description purposes.

The transmission line 106 or serial communication channel, as it is often called, can be one of, or a combination of, traces or strip lines of a printed circuit board. The transmission line 106 can also include, backplane wiring, many types of cable or cabling and can include a variety of connectors to interconnect the transmitter 102 to the receiver 104. The transmission line 106 can provide impedances that are matched to the input and output impedance of the transmitter 102 and the receiver 104 such that noise on the transmission line 106 is minimized and the power of the signal is not significantly degraded as it travels over the transmission line 106.

In one embodiment, the transmitter 102 and receiver 104 can exchange data at rates in excess of three Gigabits per seconds. At such high data rates, accurate reading of the data requires the receiver 104 to synchronize with the incoming data waveform such that the data can be accurately sampled. Initially, or on power up, it may take time for the receiver 104 to synchronize and some bits may be lost during power up and the handshake procedure, but error correction and detections schemes typically retransmit lost data such that the system can recover data that may be lost. Assuming that some bits are being accurately received by the receiver 104 the disclosed system 100 can improve the timing of the data sampling clock of the receiver 104 such that the data waveform can be read at an "optimal" time, and this can increase the accuracy of the received data and reduce the error rate of the communication.

In accordance with the present disclosure, a single clock signal from a single clock generator 110 can provide a clock signal to the data waveform sampler 116. The data waveform sampler 116 can be connected to the transmission line 106 and record time-amplitude samples of the data waveforms that are incoming to the receiver 104. Data waveform sampler 116 can provide a dynamic time-amplitude testing routine that can provide a series of sample points that converge on a waveform edge at different times to acquire data about the waveform. Such a testing sequence can be continually adjusted based on previous test results of known bit patterns and the test sequence can also be altered to conduct different types of tests.

When it is determined that a predetermined bit pattern has occurred on the transmission line 106, the time-amplitude samples recorded during such detection can be analyzed by the clock synchronizer 108, and accordingly the clock synchronizer can adjust the timing of the data sampling clock in the receiver 104. The data sampling clock can be a distributed clock that originates from clock 110, is modified by clock synchronizer 108 and the modified clock can be utilized by the receiver 104 to synchronize operation of components within the receiver 104 with the incoming data waveform. Accordingly, the single low power clock 110 can be utilized to recover data over a communication link or a transmission line. Such a single clock system 100 can operate on half the power required by traditional receivers requiring two distributed clocks, and the single clock system will generate less noise and provide increased accuracy in data retrieval.

In one embodiment an amplitude-shifted sample is taken at the same time as the data sample, and such a sample can be utilized to determine the timing location of the center of an eye pattern for a differential signal. Based on the center of the eye, and other attributes provided by the data, the clock synchronizer 108 can adjust the sampling clock signal. In other embodiments two amplitude-shifted samples are taken together with the data sample at "instances" leading and lagging the data sample by small time offsets. The information from these samples can be fed to a logic module which can adjust the sampling clock according to the information.

The disclosed system 100 can be effectively utilized in Gigahertz range for digital data transmissions from chip-to-chip over short electrical links. One such configuration where the system could be utilized is in a router or a switch in a telecommunications system that supports the Internet Protocol based communications where the highest possible data rate with the lowest possible error rate is desired. Transmitter 102 can be implemented by a set of electrical components that are integrated on an integrated circuit or chip with many other devices or components that provide many other functions such as routing and error detection-correction. Likewise, receiver 104 can be integrated with other devices on the same chip and can be part of a "system-on-a-chip". The system 100 could also be utilized in the multiple Gigabits per second systems transferring data from chip-to-chip over wired media, such as a backplane of a state-of-the-art router.

Figure 2:
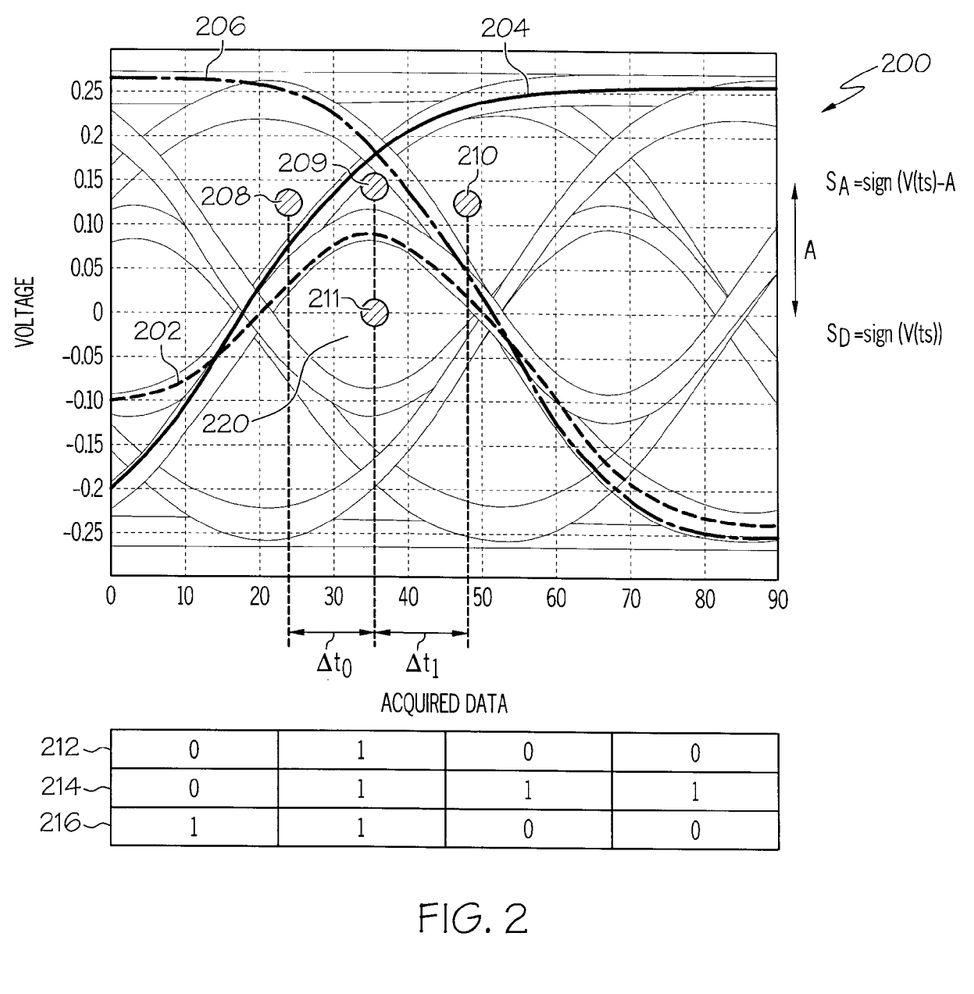
FIG. 2 depicts a graph of data waveforms that produce eye patterns.

Referring to FIG. 2, a graph 200 of superimposed data waveforms is illustrated. More particularly, three different data waveforms 202, 204 and 206 that represent different sequential bit patterns are "emphasized" on the graph 200. Waveform 202, illustrated by a short dashed line, provides a bit pattern acquisition of "0-1-0-0" as illustrated by acquired bit pattern 212, directly below the graph 200. It can be appreciated that the location of the bits in the acquired data section are directly below, and a representation of, the bit pattern provided by the waveform in the graph 200 at each time interval or bit cycle defined generally, by the vertical lines in the chart.

Waveform 204 is illustrated by a contiguous line, and provides a bit pattern transmission of "0-1-1-1" as illustrated by bit pattern 214. Waveform 206 is illustrated by long dashed line segments and represents the bit pattern transmission of "1-1-0-0" as illustrated by bit pattern 216. Accordingly, the data waveforms have a bit cycle or bit reading time period (approximately 22 nanoseconds on the graph) and sometime during the bit cycle the receiver can sample or acquire the value of each bit. However, the center of the eye 211 is arguably a "best" time to sample the waveform and acquire the bit and one key to receiver synchronization is to determine an optimum time during the bit cycle to read the value (voltage) of the waveform. This determination can be utilized to modify a time when the data sampling clock triggers or clocks a latch to read such data.

In accordance with the present disclosure, a small transition is defined by bit patterns such as 0-1-0 and 1-0-1 (a sequential toggling of the waveform to alternate states) where large data transitions are defined by sequential bit patterns such as 0-1-1, 1-1-0, 0-0-1 or 1-0-0 where two logic highs or two logic lows are transmitted sequentially. It can be appreciated that the illustrated waveforms including waveforms 202, 204, and 206 exhibit different maximum values, minimum values, and transition points at the input of the receiver.

For example, it can be appreciated that a small transition shown by waveform 202 never reaches a rail voltage because the signal is changing too quickly for the waveform to reach such a value. Conversely, large transitions such as those shown by waveforms 204 and 206 can reach a rail value such as + or −0.25 volts and the waveform can stay at such a value until the data under transmission requires the waveform to transition to an opposite state.

An eye pattern 220 is illustrated, where the eye has a center 211. Exemplary time-amplitude sample points 208, 209, 210, and 211 at the center of the eye are also illustrated on the graph 200. As stated above, many different test routines or test processes can be implemented by the disclosed system. Two different types of test routines are illustrated in graph 200. In a first embodiment, time-amplitude samples 209 and 211 are part of a first distinct test routine where the time-amplitude samples are taken at a single, specific time, namely, concurrently with what is perceived as the center of the eye pattern 211.

In a second distinct test routine, samples can be taken at three different times during a bit cycle. A first sample time can occur during a rising edge of a 0-1-1 transition, such as at t0 before the center of the eye 211, a second sample time can occur concurrently with the center of the eye 211, and a third sample can occur at a time t1, after the center of the eye 211.

In the "first" single sample time embodiment, time-amplitude samples such as samples 209 can be acquired concurrently with perceived occurrence of the center of the eye 211. Given the parameters of a system, the waveform associated with a particular bit pattern typically will not change much over time. Thus, if an eye pattern is stressed due to impedance mismatches at power up, this stressed eye pattern will remain relatively constant in time. As stated above, the test routine can continually alter where a test point is taken in subsequent identical bit patterns to identify where the edge of the waveform of a specific bit pattern is occurring. The test point can be altered by utilizing a voltage adder and different offset voltages concurrently with the center of the eye 211 to acquire at least an average of what time and at what voltage the edge of the waveform is occurring.

For example, to acquire sample point 209, an amplitude sampling control loop can invoke an offset voltage such that the bit sample at 209 would acquire a logic high at test point 209. It can be appreciated that test point 209 has a voltage that is les than the waveform edge voltage, and thus the bit can be toggled high as a "hit." In a subsequent bit pattern, the offset voltage can be raised over 0.05 volts and a test point such as 209 can be taken, and since the test point has a voltage that is greater than the waveforms voltage at the sample time, the bit acquired for the test sample would a logic zero as a "miss" would occur.

Based on these results, the offset voltage could be altered or lowered to converge on the exact time-amplitude location of the waveform edge. A hit-miss, hit-miss sequence while varying the offset voltage a few hundredths of a volt in subsequent bit patterns can accurately locate and track the waveform edge. Thus, the testing routine could determine generally, that the waveform edge has a specific voltage at specific time and this information can be utilized to determine if the eye is stressed and how the sampling clock should be adjusted. In addition, the time when the time-amplitude sample is taken can be altered to determine the imaginary crossover point where the larger transitions 1-0-0 and 0-1-1 occur (which occurs in the graph 200 just above 209). The predetermined time-amplitude test sample can generally be located by starting the sampling procedure at a percentage of the rail voltage during the center of the eye. In the illustrated graph 200, sixty percent 60% of the rail value is where the imaginary crossover will occur at the center of the eye.

As mentioned above, a second embodiment or routine for acquiring useful time-amplitude samples can include acquiring three samples in bit cycle, a pre eye sample, a center eye sample, and a post eye sample. Time-amplitude sample 208 leads the center of the eye 211, and time-amplitude sample 210 lags the center of the eye 211. Sample 208 can be taken at the same time with different offset voltages where the first samples at 208 and 210 would acquire a logic zero and other samples at 208 and 210 would acquire a logic one as they successfully detect the waveform voltage. As with the first embodiment the voltage can be varied such that the test points hit-miss, hit-miss, hit-miss to locate and track the edge of the waveform. Such a plurality of time-amplitude samples can be stored by the disclosed data waveform sampling system.

As stated above, the data waveform sampling system can store a single binary value indicating that a waveform has a specific voltage at a specific time (a successful time-amplitude test). In another embodiment the sampling system could read and store a digital value having multiple bits (such as 4 bits) that reflect the magnitude of the analog voltage of the data waveform at a particular time. In other embodiments, the sampling could be done below the zero volt line (in the bottom half of the graph) and in yet other embodiments a multiple samples, instead of just three samples, could be taken on either side of the incoming data waveform.

In one example, when a bit sequence of 1-1-0 occurs five times over a period, of say 100 bits, a time-amplitude sample from each of the five different intervals may be successful at some time-amplitude combinations (i.e. may record a hit or a logic one) and may be unsuccessful at other time-amplitude combinations. This data on the same bit pattern over a hundred bit interval can provide useful information such as a "trend" that the data waveform is leading or lagging the center of the eye pattern 211. Such a single clock method can be accomplished with a fraction of the power consumption of traditional CDR circuits and methods.

In accordance with the present disclosure, it has been determined that time-amplitude sampling of specific bit patterns such as a pattern having large transitions including those illustrated by waveforms 202 and 206, can provide timing recovery information that can be utilized to "fine tune" or modify the sampling clock timing and achieve improved performance. Modifying the timing of the sampling clock can provide improved data error rates for a communication system while the single clock system can significantly reducing the power consumption of the receiver. Time-amplitude samples may only be taken every hundred bits and the teachings of the present disclosure can reduce the number of clocks, clock generators and clock transitions required to acquire data and thus can reduce the overall power consumption.

The system disclosed may be idle during a start up procedure and when the start up procedure is competed, the disclosed system can be implemented to continuously adjust the sampling clock to provide a significant improvement in the error rate while greatly reducing the power consumption and circuitry required to achieve such improvement. The waveform parameters as determined by the sampling data can be utilized to provide a sampling clock trigger to a receiver such that the receiver can read the data from a data waveform at an "ideal" or "preferred" time. In another embodiment the waveform sampling clock at t0 can be advanced (or moved to the left on the graph 200) or delayed until a successful hit occurs and likewise t1 can be advanced or retarded to locate the waveform edge. This time control can be accomplished by controlling a delay module that provides a delay to waveform sampling clock.

In one configuration a single clock generated by a delay module can be delayed by various delay gates to generate additional asynchronous waveform sampling clock signals. Such types of signals can provide the timing for 208 and 210 data acquisitions. These clock signals can be utilized to sample the waveform and provide a "bracket" of data for a particular three bit sequence. As illustrated, the spacing between the three clock signals can be a small fraction of the bit cycle. For example, the time between the signals may be on the order of a few Picoseconds.

Likewise, the data sampling signal can provide a synchronous data clock signal that can be corrected a few Picoseconds from the center of the eye 211 based on a detected trend that the large transitions lead the center of the eye pattern. Alternately, when a trend is detected that large transitions lag the center of the eye, the sampling clock can be adjusted such that it lags the center of the eye 211. When data is being received at very high speeds, fine-tuning the sampling clock a few Pico-seconds before the center of the eye or after the center of the eye can make a substantial difference in the data error rate.

Generally, utilizing starting sampling sequence, the sampling routine can be controlled by control loops such that the time-amplitude samples converge to acquire precise waveform data. Such operation of the control loop is further described below with reference to FIG. 3 below and with respect to Table 1 and Table 2 below.

Figure 3:
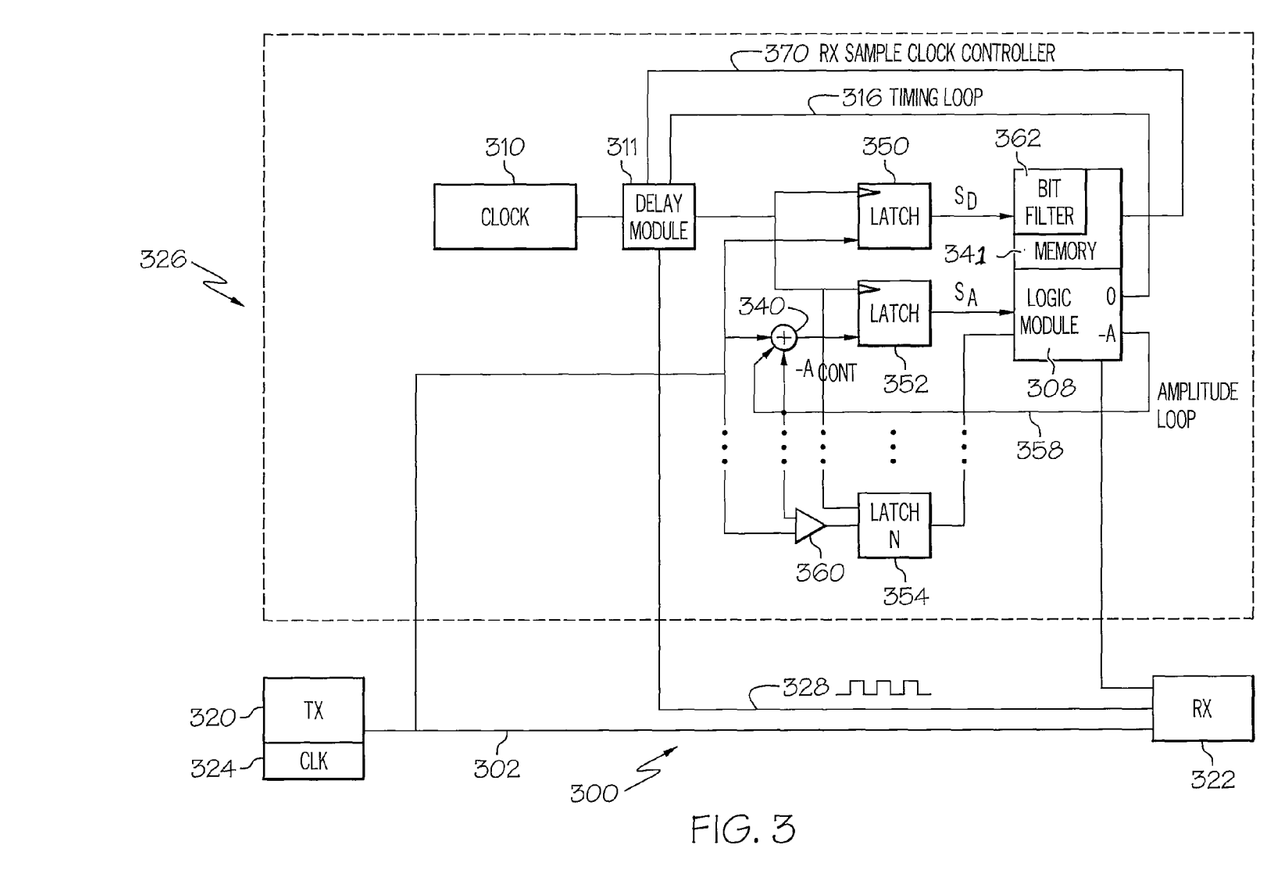
FIG. 3 illustrates a block diagram of a communication system.

Referring to FIG. 3, a single-clock data receiver system 300 is disclosed. As stated above that single clock system can operate on a single clock input because the system does not require a data waveform crossover detection system or over sampling as in traditional CDR systems. The system 300 can include a transmitter 320 with a clock 324 that sends data over transmission line 302 to receiver 322. A data waveform sampler/synchronizer (DWSS) 326, within the dashed block region, can monitor the bit patterns and waveform data that are present on the transmission line 302. Based on the bit pattern and acquired waveform data, the DWSS 326 can provide an accurate data sampling clock signal 328 to the receiver 322.

The DWSS 326 can include clock 310, delay module 311, latch 350, latch 352, and many additional latches indicated by latch N, 354, (Latches 350-354), memory 341, logic module 308, bit filter 362, adder 340 and comparator 360. In accordance with the present disclosure, a system, apparatus and method are disclosed that can utilize a single clock signal from the clock 310 to provide an accurate data sampling clock 328 that will synchronize the receiver 322 with the data waveform. The DWSS 326 can also determine many other parameters of the data waveform. For example, the DWSS 326 can determine the center of the eye pattern of the waveform based on sampling the amplitude of various bit patterns and the DWSS 326 can acquire attributes or parameters of the data waveform such as the timing and location of maximums, minimums, crossovers and other information regarding the differential signal can be determined. Such information can be utilized to adjust the sampling clock, control the testing pattern and control the operation of the system generally.

In one embodiment, only two latches, latch 350 and latch 352, are required to tune the data sampling clock 328. In the two latch embodiment, latches 350 and 352 can acquire time-amplitude samples of the data waveform on the transmission line 302. In this embodiment, the time-amplitude sample data can again be binary (hit or miss) that indicates if the data waveform is above or below a specific voltage at a specific time as determined by an offset voltage provided to the adder 340 via amplitude control loop 358 and by a time delay signal provided to the delay module 311 via the timing control loop 316.

During operation of the two latch embodiment, latch 352 can acquire the time-amplitude samples at different times and voltages (locations on the graph) responsive to a waveform sampling clock provided by the delay module 311, and an offset voltage provided by the adder 340. If the waveform voltage, minus the offset voltage on the amplitude loop 358 is sufficient to toggle the latch 352 when the clock input of the latch is provided by the delay module 311 the output of the latch 352 will provide a logic one on its output. However, if the offset is so high that the latch 352 will not toggle then the latch 352 will provide a logic low on its output. As stated above, the timing and the offset can be continuously adjusted to converge on the edge of the waveform or to "dance" on and off the waveform edge when it is located to continuously monitor movement (if any) of the edge of the waveform.

The delay module 311 under the control of the logic module 308 and via timing loop 316 can provide various adjustable time delays to clock the sample into each latch 350-354. The adder 340 can be controlled by the logic module 308 via amplitude loop 358 such that various waveform voltages can be sampled. Latch N 354 and comparator 360 depict an alternate embodiment where comparator 360 can be utilized instead of an adder and latch N 350 can allow more data points to be taken during each bit cycle.

As stated above, the time-amplitude samples become more valuable when they can be associated with bit patterns such as large transitions. Thus, latch 350 can acquire the binary data provided by the waveform on transmission line. Accordingly, data acquisition by latch 350 can be triggered by waveform sampling clock from the delay module 311. Latch 350 can acquire serial binary data from the waveform on the transmission line 302 and can send the acquired serial binary sequences to the bit filter 362. The bit filter 362 can detect the occurrence of specific bit patterns such as specific large transitions.

After the bit pattern filter 362 detects specific, predetermined bit patterns, such as a 1-0-0 patterns, the logic module 308 can retrieve the time-amplitude samples associated with the 1-0-0 patterns from memory 341 and utilize such data to control the delay module 311 via control line 370 to improve the timing of the data sampling clock 328. In one embodiment, the logic module 308 can utilize combinational logic to modify the control loops 316 and 358 for improved time-amplitude data and can modify the data sampling clock via 370 control line based on the acquired time-amplitude data.

More specifically, the DWSS 326 can identify specific bit patterns and based on identified bit patterns and waveform time-amplitude data, the DWSS 326 can determine how the sample clock timing should be adjusted. Based on the amplitude and timing of these waveforms the logic module can control the delay module 311 that can provide the sampling clock signal 328 to receiver 322, allowing receiver 322 to accurately receive the data from the transmitter 320. Traditional low cost logic gates and registers, can be utilized to implement the disclosed system.

In one embodiment, time-amplitude samples can be analyzed based on the reception of a specific three bit pattern such as the bit patterns 0-0-1 and 1-1-0 by the bit filter 362. The timing control loop 316 can alter the timing that dictates when the sample is taken and the amplitude loop 358 can alter the test level for the amplitude portion of the time-amplitude sample. For example, when three different 1-1-0 bit sequences occur over a period, of say 100 bits, a single sample from each of the three different intervals may be utilized to reveal useful information regarding the data waveform. Such useful information may include when, in relation to the sampling clock, the data waveform transitions are occurring and the slope or shape of the transition of the data waveform.

The bit pattern filter 362 can filter bit patterns and can allow the system to ignore data acquired during small transitions and to suppress sample acquisition control loops. Small transitions typically do not reveal significant data about a lead and lag phenomena and waveform transition trends. More particularly, such an analysis on small transitions typically does not reveal if the sampling clock is too late or too early with relationship to the waveform transitions, or that performance can be improved with a timing adjustment. Generally, comparing the small-transition waveform with the large transition waveforms it can be appreciated that a small-transition rises and falls in one bit cycle. Hence, it is difficult to determine the direction that the sample timing should be moved for improved data reception.

The decision to advance or retard the sampling clock (or the exact time to acquire the data from the transmission line) can be determined based on the detected "location" of rising and falling edges of the data waveform. The timing loop 316, phase tracking loop, or sample clock timing modification loop as it may be called, that can control the sampling clock signal 328 can be relatively slow and does not control the delay module 311 on a "bit-by-bit" basis. The timing loop 316 can act as more of a correction for long term "trends" or long term drift of the waveform timing. Accordingly, when a large transition is identified by the processing logic 308, the time-amplitude samples of this identified waveform can be evaluated to determine if a "long term" sampling clock modification solution should be implemented.

The large transitions are rising, or falling from rail voltage to rail voltage, and it is easier to acquire accurate data during such large transitions because the "side" of the waveform transition where accurate data can be acquired is easier to determine. Typically, the large transitions will provide a better waveform for timing analysis because they have a higher voltage swing and more predictable curves or slopes. In addition, data acquisition proximate to large transitions benefits more from fine tuning of the clock sampling signal than does CDR sampling acquisition proximate to small transitions. Waveforms that have large transitions generally, provide more data points regarding whether the sample clock is too early or too late.

As stated above, the timing of the sampling clock can be fine tuned, but the tuning (advancing and retardation) of the sampling clock may not be done on a "bit-per-bit" basis and can be done as trends that span hundreds of bits. This is because timing variations in the transmitted data typically occurs quite slowly with respect to the bit speed or signal transitions that create the incoming data. Thus, the receiver 322 can track the timing of the incoming data with relatively slow phase tracking loop 316.

From the reception of one bit to the next, the sampling clock 328 or timing provided to the receiver 322 may not change significantly. In response to the output of the logic module 308, the phase tracking or timing loop 316 and the position or setting of the delay module 311 can change relatively slowly over the course of receiving a series or bits or bit patterns. For example, the delay module 311 may advance or retard the sample clock one Pico-second or one increment for every 100 signal transitions or bits received.

This relatively slow correction, or control loop response is acceptable to account for the variations caused by chances in temperature and in hardware properties such as the channel variations, circuit variations and also for small frequency offsets (i.e. <0.02%) because such variations typically do not change dynamically at a rate that is on the order of the data rate. It can be appreciated that when a system is new or "just out of the box" that impedance mismatches, stray capacitance in the circuit, transmission line length supply voltage and other manufacturing tolerances can change the electrical properties of the transmission line 302. Thus, a slow control loop can correct these predominantly "static" deficiencies to improve the communication link based on "long term" corrections or a long term solution.

In another embodiment additional latches such as latch N 354 can be utilized to acquire multiple data points in each bit cycle. Thus, the number of latches can depend on the desired number of samples to be taken each bit cycle and how fast the latches 350-354 can acquire and store the samples in memory 341. Thus, depending on the clocking, one latch may only be able to acquire one sample in one bit cycle. In one embodiment, the logic module 308 can control an amplitude sampling loop 358 that can provide a reference voltage to comparator 360 which can operate similar to the adder 340 and latch 352. In the case where numerous latches are utilized some of the latches could only be activated periodically to conserve additional power. In one embodiment, the delay module 311 can be implemented by a phase rotator or a simple ladder of gates each providing a successive delay to the clock signal.

In yet another embodiment, instead of a latch, an analog to digital converter (not shown) could accept the waveform upon the clock signal and convert the waveform voltage to a digital value and provide the digital data to the memory 341 as an eight bit word such that the logic module 308 could utilize the exact waveform value in computation of its control loops and the data sampling signal 328. In another embodiment, the logic module 308 can generate a digital signal that controls adder 340, such that adder 340 can either boost ($A_{up}$), or attenuate ($A_{down}$) the offset voltage A to adjust the amplitude test point for the timed test sample.

As stated above, traditional clock and data recovery receivers utilize at least two distributed clocks to acquire data from the differential data waveform and utilize many times oversampling and have significant power consumption. In one embodiment, the DWSS 326 of the present disclosure can determine the center of the eye pattern utilizing a systematic sampling procedure that acquires a series of binary values representing time-amplitude data of the waveform. The binary values can be utilized, and compared to data that identifies ways to improve the data sampling timing such that the data sampling clock can be fine tuned.

The time-amplitude testing or test routine provided by the logic module 308 can be based on a predetermined or learned routine that can acquire a plurality of strategically located time-amplitude samples of the data waveform. Time-amplitude sampling can be conducted in many ways depending on what data is desired. Above two embodiments are provided in detail. One way to implement the testing routine that is described above with the three sample points (218X, 211 and 210X is provided below in Table 1.

Referring to Table 1 below, the $A_{up}$ and $A_{down}$ signals on the amplitude control loop 358 can be generated based on the results of the bit pattern filter 362 performing bit pattern filtering. More specifically, in Table 1 the control loops are adjusted based on a detection of large transitions by the bit pattern filter 362. The amplitude adjustment signal can be filtered within the logic module 308 by a low-pass filter to remove any quick response of the signal in the control loop. The digital value of the amplitude control signal ($A_{up}$ and $A_{down}$) can be incremented or decremented and the digital value can be provided to a digital to analog converter (not shown) either in the logic module 308 or in the adder 344 such that the adder 344 can add or subtract the analog voltage that is utilized to sample the data waveform voltage.

The time-amplitude analysis of the present disclosure can also be utilized to detect or acquire additional parameters and attributes of the data waveforms by modifying the sampling process. For example, the logic module can determine the center of an eye pattern of data waveforms and reveal minimums and maximums and average values of the data waveform. The logic module can also identify a trend of leading or lagging waveforms, can measure the distortion of the eye and can identify the locations of crossovers of the differential data waveform. The detected attributes can be utilized to continually optimize the sample clock timing. Thus, the timing of the receiver can be continually tuned or adjusted based on time-amplitude samples obtained from waveforms with known bit patterns.

As illustrated, the output of latch 350 can provide an SD output which is generally, a signal representing the voltage at the center of the eye pattern when the sampling clock reads the data waveform, where SD=sign (V(ts)). Likewise, the output of latch 352 can provide an SA output where SA=sign (V(ts) −A) where A is the amplitude of the control loop and A is a "reference voltage" that can be subtracted from the waveform voltage V(ts) at the sample time by the adder 340. Accordingly, output of the latch 352 can provide the amplitude portion of the time-amplitude sample. (See the right margin of graph 200 in FIG. 2).

SDn−1 in column 1 indicates a first bit in a sequence of three bits for the bit pattern filter, $SD_n$ indicates a second bit in the progression and SDn+1 indicates a third bit in this succession. $SA_n$ represents a time-amplitude sample taken proximate to the $SD_n$ sample as $SA_n$ may lead or lag the SD sample depending on the pre-eye post-eye control. Column $SA_n$ indicates a sample taken during the interval which the $SD_n$ bit was read and, this discussion is concerned with the situations where $SD_n$=1 in the middle of a large transition. Such cases appear on rows 7, 8, 13, and 14 of Table 1. As stated above, the control loops 316 and 358 can be adjusted based on the time-amplitude samples for predetermined pattern(s) (i.e. large transitions) and modification of the signals on the control loops can be performed in accordance with controlling pre-eye center sampling when a "1" is captured by latch 352 in the pre eye column and controlling the post eye center sampling when the latch 352 acquires a "1" in a post eye center sample.

For the following discussion it may be helpful to refer back to FIG. 2. When a progression of bits is 0-1-1, is detected by the pattern filter 362 and the time-amplitude (SAn) sample as shown by seventh row of Table 1, does not detect a sufficient voltage on the transmission line, (i.e. records a zero) then the time-amplitude sample point is "above" the waveform and the logic module 308 can force the generation of a delayed or retarded sample time and a voltage value can be added to the data waveform voltage ($A_{up}$) to increase the offset voltage by an appropriately chosen or predetermined voltage increment ΔA. Such control changes can be made in increments until $SA_n$ acquires a logic 1 which means that a point on the leading edge of the waveform has been located.

Thus, in Table 1 the amplitude loop control signals $Au_p$ indicates decreasing the offset voltage and $A_{down}$ indicates increasing the offset voltage. As discussed above, the $Au_p$ and $A_{down}$ signal can be fed to the adder 340 and the pre eye/post eye signal can be sent to the delay module 311. With regard to the description above on the seventh row it may be beneficial to refer to rising waveform 204 of FIG. 2 which illustrates a 0-1-1 bit pattern and sampling point 208 which occurs before the center of the eye. In the seventh row, since the waveform is rising and $SA_n$ did not detect a voltage or a logical one, (it is a "0" in Table 1) before the center of the eye, the time-amplitude sample has been taken too early and/or at too high of a voltage to detect the edge of the waveform. Thus, the control loops can move the time-amplitude sample point closer to the waveform edge by decreasing the offset voltage and providing less offset voltage to the adder 340. The control loops can continue to move the time-amplitude sample point until the logic module acquires a logical 1 for the $SA_n$ value and then as illustrated in row 8 the time-amplitude sample can move away from the edge such that the sampling "dances" on and off the edge of the waveform. Sampling "on the edge," "off the edge," and "on the edge" can first detect the location of and then track any movement of, the edge of the waveform.

In another example, illustrated in row 14, when a rising edge is occurring such as one created by a 1-1-0 progression, and the sample data $SA_n$ does acquire a logical 1 as indicated by the "1" under $SA_n$ in row 14, in a pre eye, time-amplitude sample, in attempt to locate the edge of the waveform where SAn will toggle to a zero value and the offset voltage can increased. To locate the edge of the waveform (such as the waveform illustrated by waveform 206 in FIG. 2) the sampling process can be performed at an earlier time or with an increased offset voltage.

These two examples show how simple combinational logic could be utilized to control at least one feedback loop to determine with great accuracy where the rising and falling edges of waveforms containing large transitions are occurring. In the example, the combinational logic of the logic module 308 and the bit pattern filter 362 only generates non-zero signals (or change the control loop operating points) for the large bit patterns where SDn is a logical 1 as illustrated in rows 7, 8, 13, and 14 of Table 1.

As illustrated in row eight a 0-1-1 progression of bits creating a time-amplitude sample of 1 can facilitate the logic module 308 to generate an "early" or "pre-center" sample and to decrease the amplitude of the data waveform by a specific voltage. The generated "early" and "late" signals, after being low-pass filtered by the logic module 308 can control the operation of the delay module 311.

TABLE 1

| $SD_{n-1}$ | $SD_n$ | $SD_{n+1}$ | $SA_n$ | Pre eye | Post eye | $A_{up}$ | $A_{down}$ |
|---|---|---|---|---|---|---|---|
| 0 | 0 | 0 | 0 | | | | |
| 0 | 0 | 0 | 1 | | | | |
| 0 | 0 | 1 | 0 | | | | |
| 0 | 0 | 1 | 1 | | | | |
| 0 | 1 | 0 | 0 | | | | |
| 0 | 1 | 0 | 1 | | | | |
| 0 | 1 | 1 | 0 | 1 | 0 | 1 | 0 |
| 0 | 1 | 1 | 1 | 0 | 1 | 0 | 1 |
| 1 | 0 | 0 | 0 | | | | |
| 1 | 0 | 0 | 1 | | | | |
| 1 | 0 | 1 | 0 | | | | |
| 1 | 0 | 1 | 1 | | | | |
| 1 | 1 | 0 | 0 | 0 | 1 | 1 | 0 |
| 1 | 1 | 0 | 1 | 1 | 0 | 0 | 1 |
| 1 | 1 | 1 | 0 | | | | |
| 1 | 1 | 1 | 1 | | | | |

When the progression of bits or received bit sequence is 1-1-0-0, as shown by thirteenth row of Table 1, then the logic module 308 can force the generation of a post eye center sample with an increased offset voltage to increase the voltage portion of the sample time-amplitude sample point. As illustrated in row fourteen, when a 1-1-0-1 progression of bits occurs this can cause the logic module 308 to generate a pre eye center signal, and to decrease the offset voltage by an increment or a specific voltage. As stated above, these adjustments can be an adjustment made relatively slowly during a time period where hundreds of bits are received by the receiver.

The logic module 308 can provide a low-pass filter for the loop signals pre eye and post eye or "early" and "late" that are sent by the logic module 308 to the delay module 311 over the timing loop 316. Such a signal can adjust the phase of the waveform sampling clock provided to the latch inputs via the delay module 311. The delay module 311 can move the position of the early and late timing signal as desired to acquire additional accuracy.

It can be appreciated that there is only one clock delay module 311 and the system 300 can operate with low power and minimal area on an integrated circuit. The system 300 provides and architecture that has at least two feedback loops running in parallel 316 and 358. These loops can dictate when, and at what voltage offset the samples are taken. The sampling phase loop 316 can fine tune the sample timing and the amplitude loop 358 can fine tune the amplitudes thresholds of the data waveform samples.

Many traditional differential data receivers synchronize the sample clock on a determination of the crossing point of the data signal with the complementary data signal. This crossing point is usually near zero volts. It can be acceptable to assume that the data signal and complementary data signal are symmetric and that the crossing point of these signals is spaced half a period away from the center of the eye pattern. Since the present disclosure utilizes large transitions to modify the sampling clock, the logic module 308 may assume that the center of the eye pattern is half way between consecutive crossings when a 0-1-0 or a 1-0-1 bit pattern occurs.

Table 2 below is another possible signal table for pre eye center/post eye center or early/late and $A_{up}/A_{down}$ signal generation for control loop provided by the logic module 308. The routine provided by Table 2 is based on a bit error rate embodiment that takes three samples as was discussed in the second sampling embodiment of FIG. 2. S1 indicates a time-amplitude sample that is taken first in time, sample S2$n$ indicates a sample that is taken second in time and S3$n$ is a sample taken third in time much like the samples 208X, 209X and 210X in FIG. 2. Table 2 illustrates how, in one embodiment the bit pattern filter 362 can generate non-zero output signals for rows 3, 4, 7 and 8.

Accordingly, it can be appreciated that control loops may only be active when S2=1 as illustrated by 209 in FIG. 2 for large transitions. The logic module 308 can dictate whether the time-amplitude clock signal will precede the center of the eye, or whether the sampling clock signal will occur after the center of the eye pattern according to the "early" "late" columns of Table 2. The logic module 308 can provide low-pass filtering on the early/late signal that results in improved up/down signals to modulate the delay module 311.

The logic module 308 can provide the amplitude adjustment signal ($A_{up}/A_{down}$) in accordance with matching the bit patterns as described by Table 1, and the logic module 308 can provide a low-pass filter the amplitude adjustment signal to remove noise and other high frequency harmonics that may result from switching devices. Further, logic module 308 can increment and decrement the digital amplitude control value $A_{up}$ and $A_{down}$. This digital amplitude value could be supplied to an analog to digital converter to achieve an analog output to supply the adder 340. In general, $A_{up}$ and $A_{down}$ can be increased and decreased unsymmetrically. For example, $A_{up}$ may increase many increments and then $A_{down}$ may decrease only a fraction of the increased steps in previous adjustments. Thus, the amplitude signal may increase many times the amount of decreased step(s) such that the waveform edge can be located.

The control criteria in Table 2 can correspond to setting the amplitude control utilizing a bit-error rate criterion. A bit error that occurs when the time-amplitude in the left and right bracket samples S1, S3, respectively, (for example 208A and 210A in FIG. 2) will occur when the bit value of the voltage-shifted samples S1 and S3 differ from the data sample acquired by S2 (illustrated by 209A in FIG. 2). It can be appreciated by looking at FIG. 2 that increasing the control amplitude or offset voltage in the amplitude control loop can lead to higher bit error rate for the S1, S3 samples. Thus when the S1, S2, S3 respectively acquire a 0-1-0 respectively (in line 3) the voltage offset can be increased until a bit error occurs on one side of the center or the other and this can indicate when the large transitions are leading or lagging the center of the eye. The timing of the time-amplitude sample that has the error can be modified to locate the waveform edge.

In one embodiment the control loop can regulate the amplitude of the first and third sample such that the bit error rate can be maintained at a predetermined given value, for example $10^{-3}$ To detect the bit error rate a standard bit error rate routine could be utilized. A sample point slightly above the center of the eye 211 could be utilized to determine the actual bit value and this value could be compared to the time-offset/voltage-offset samples acquired on each side of the center of the eye to provide a bit error rate. A setting of the voltage offset for S1 and S3 that has an acceptable amount of successes will detect "where" the edge of the waveform is located in time and amplitude.

It can be appreciated that using the described bit error rate criterion applied on a stressed eye pattern (an eye pattern possibly shifted in voltage and amplitude) the system can effectively place the sampling clock transition or trigger at the optimum sampling point in the bit cycle. It can be appreciated that this feature is not present in traditional two clock receivers that even utilize more than two samples per bit cycle to recover the timing.

Figure 4:
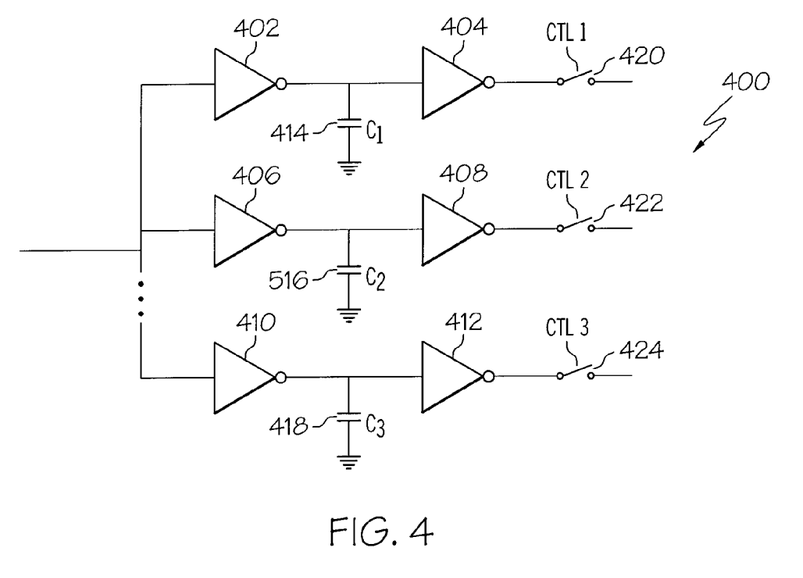
FIG. 4 depicts a block diagram of a delay circuit.

Referring to FIG. 4 one embodiment of a delay module 400 that can provide clock signals having various delays is illustrated. Inverters 402, 406, and 410 can receive clock signals from a clock or a phase rotator and can have an output loaded with different capacitances. Different capacitors $C_1$ 414, $C_2$ 416, $C_3$ 418, with different capacitance values can provide different delays on the outputs. The value of each capacitor 414, 416 and 418 will determine how much of a time delay each clock output will have. C1 414 can be smaller than C2 416, and C2 416 can be smaller than C3 418, such that different delays of the desired time period are provided by the clock outputs $\phi_1$ 420, $\phi_2$ 420, and $\phi_3$ 420. The outputs could be connected together and a "tri-state" output could be created utilizing switches 420, 422 and 424.

Figure 5:
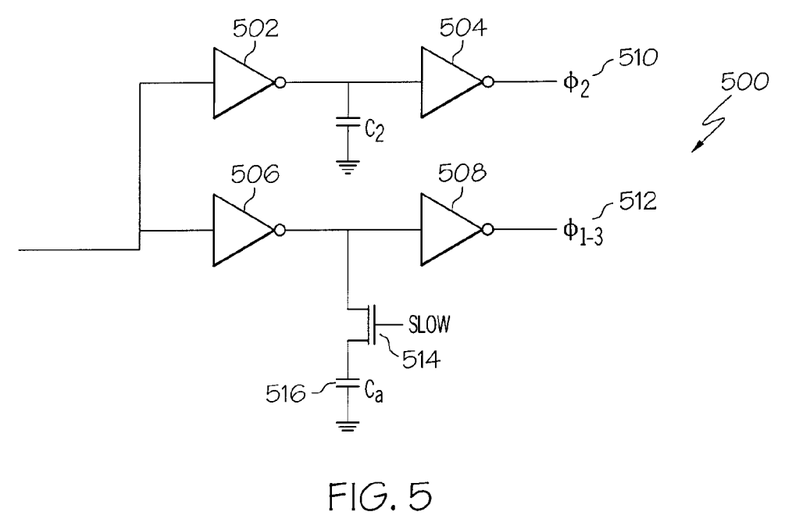
FIG. 5 illustrates a block diagram of an alternate delay circuit.

An alternative embodiment for providing delayed clock signals is depicted in FIG. 5, where only two local clocks $\phi_2$, 510 and $\phi_{13}$ 512 are generated. A switch 514 can be switched to determine the capacitive loading of the clock by capacitor 516 to create clock $\phi_{1-3}$ 512. Thus depending on the transconductance of the switch 514 and the value of the capacitor transistor clock signal $\phi_{1-3}$ can act as a preceding or delayed clock signal in relation to the center of the eye pattern.

Figure 6:
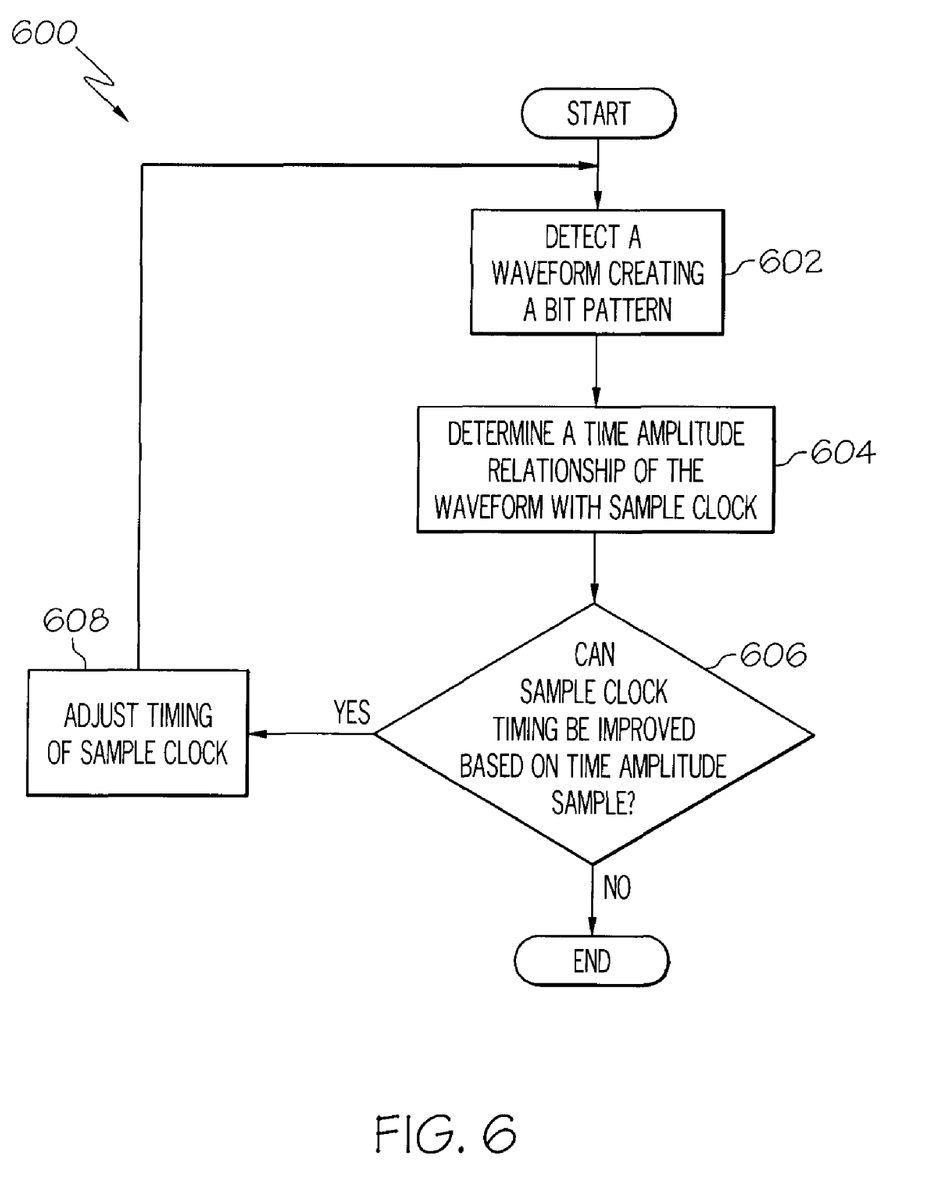
FIG. 6 depicts a flow diagram of a method of clock data recovery.

Referring to FIG. 6 a flow diagram of illustrating a method for clock and data recovery is disclosed. As illustrated by block 602 a bit pattern can be detected from an incoming data waveform. Such a detection process can be performed by a bit pattern filter. The bit pattern filter can detect large transitions and activate an analysis on data that was acquired on the waveform when it was being received. As illustrated by block 604, a plurality of time-amplitude-samples that were acquired from the waveform that produced the bit pattern can be utilized to determine a time-amplitude relationship of the waveform to a data sampling clock.

As disclosed above a dual control loop sampling system can be utilized to acquire data about the waveform. For example, a timing loop can control the timing of when the samples are taken, and the amplitude control loop can control the voltage level utilized in the sample. Thus, low cost latches can be utilized to determine if the data waveform has a voltage that is below a certain level at a specific time. The control loops can alter the test points to accurately acquire data about the waveform.

At decision block 606, a logic module can utilize the acquired data or time-amplitude samples of the waveform to determine if the sampling clock timing can be improved. If

TABLE 2

| $S1_n$ | $S2_n$ | $S3_n$ | early | Late | $A_{up}$ | $A_{down}$ |
|---|---|---|---|---|---|---|
| 0 | 0 | 0 | | | | |
| 0 | 0 | 1 | | | | |
| 0 | 1 | 0 | | | 1 | |
| 0 | 1 | 1 | | 1 | | |
| 1 | 0 | 0 | | | | |
| 1 | 0 | 1 | | | | |
| 1 | 1 | 0 | 1 | | | |
| 1 | 1 | 1 | | | | 1 | the timing can be improved, then the timing of the sample clock can be adjusted as illustrated in block 608 and then the process can revert back to block 602. If the sampling clock cannot be improved then the process can end.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods, systems, and media that provide a driver with situational awareness information. It is understood that the form of the invention shown and described in the detailed description and the drawings are to be taken merely as examples. It is intended that the following claims be interpreted broadly to embrace all the variations of the example embodiments disclosed.

What is claimed is:

1. A method for generating a sampling clock signal comprising:
    storing a predetermined bit pattern, the predetermined bit pattern being a sequence of at least three bits of data;
    receiving a waveform comprising a series of bits of data;
    acquiring time-amplitude samples of the waveform wherein the waveform has an edge;
    detecting an occurrence of the predetermined bit pattern by detecting the sequence of at least three bits of data in the series of bits of data of the waveform based upon the time-amplitude samples;
    analyzing the time-amplitude samples associated with the predetermined bit pattern responsive to detecting the occurrence of the predetermined bit pattern;
    adjusting the timing of the sampling clock signal away from the edge of the waveform responsive to analyzing the time-amplitude samples;
    storing a second predetermined bit pattern;
    detecting an occurrence of the second predetermined bit pattern;
    storing time-amplitude samples associated with the second predetermined bit pattern; and
    readjusting the timing of the sampling clock signal based on the occurrence of the second predetermined bit pattern and the time-amplitude samples associated with the second predetermined bit pattern.

2. The method of claim 1, further comprising bit filtering the waveform to determine the occurrence of the predetermined bit pattern.

3. The method of claim 1, further comprising advancing the timing of the sampling clock signal based on the analyzing determining that the waveform is advanced in time.

4. The method of claim 1, further comprising retarding the timing of the sampling clock signal based on the analyzing determining that the waveform is lagging in time.

5. The method of claim 1, adjusting a time and an amplitude where the time-amplitude samples are taken.

6. An apparatus comprising:
    a synchronizer to modify a sampling clock timing signal in response to detection of a predetermined bit pattern and time-amplitude data captured from a waveform comprising a series of bits of data and an edge, the synchronizer comprising:
        an adder to add a negative offset voltage to a voltage of the waveform during a time-amplitude sampling period to acquire varying time-amplitude test points based on the offset voltage;
        a logic module to analyze the time-amplitude data to control a time-amplitude testing routine on the waveform and to acquire the time-amplitude data from the waveform; and
        a bit pattern filter to identify bit patterns in the series of bits of data of the waveform, the bit patterns identified based on the predetermined bit pattern, the predetermined bit pattern being a sequence of at least three bits of data, which, upon detection in the data signal of the waveform, trigger analysis by the logic module of the time-amplitude data and adjustment of a sample clock timing signal away from the edge of the waveform for capturing the series of bits of data from the waveform based upon the analysis.

7. The apparatus of claim 6, further comprising a clock generator to generate the sampling clock timing signal.

8. The apparatus of claim 6, wherein the synchronizer comprises a first latch to accept and store the time-amplitude data responsive to the time-amplitude test routine.

9. The apparatus of claim 8, wherein the synchronizer comprises a second latch to accept and store a second time-amplitude sample responsive to the time-amplitude test routine.

10. The apparatus of claim 6, wherein the synchronizer comprises a comparator to determine if at least one of the time-amplitude samples has a voltage that is greater than a predetermined voltage as determined by the time-amplitude test routine.

11. The apparatus of claim 7, wherein the logic module controls the offset voltage.

12. The apparatus of claim 6, wherein the logic module further comprises a low pass filter.

13. The apparatus of claim 6, wherein the bit pattern filter identifies large transitions as the predetermined bit pattern.

14. A communication system comprising:
 a transmitter to transmit data, the data having bit patterns;
 a memory to store at least one predetermined bit pattern, the at least one predetermined bit pattern being a sequence of at least three bits of data;
 a receiver to receive a series of bits of data as a waveform wherein the waveform has an edge, to acquire time-amplitude samples from the waveform, to generate a clock modification signal in response to detection of the at least one predetermined bit pattern in the series of bits of data and an analysis of the time-amplitude samples associated with the at least one predetermined bit pattern;
 a data sampling clock coupled to the receiver to utilize the clock modification signal to modify properties of the data sampling clock including adjusting a timing of the data sampling clock away from the edge of the waveform;
 a first latch coupled to the receiver to receive the waveform;
 a second latch to receive amplitude modified waveform from the transmitter, the second latch coupled to an amplitude sampler control loop to vary acquisition voltage amplitude of the time-amplitude samples; and
 an adder coupled to the second latch to subtract a predetermined voltage from a voltage sampled from the waveform.

15. The communication system of claim 14, further comprising a test pattern clock and a delay module coupled to the receiver, wherein the test pattern clock can provide a clock signal to the delay module such that the acquisition time of the time-amplitude samples can be varied.

16. The communication system of claim 14, wherein the receiver utilizes a time-amplitude testing sequence to acquire a plurality of time-amplitude samples.

* * * * *